Patented May 18, 1937

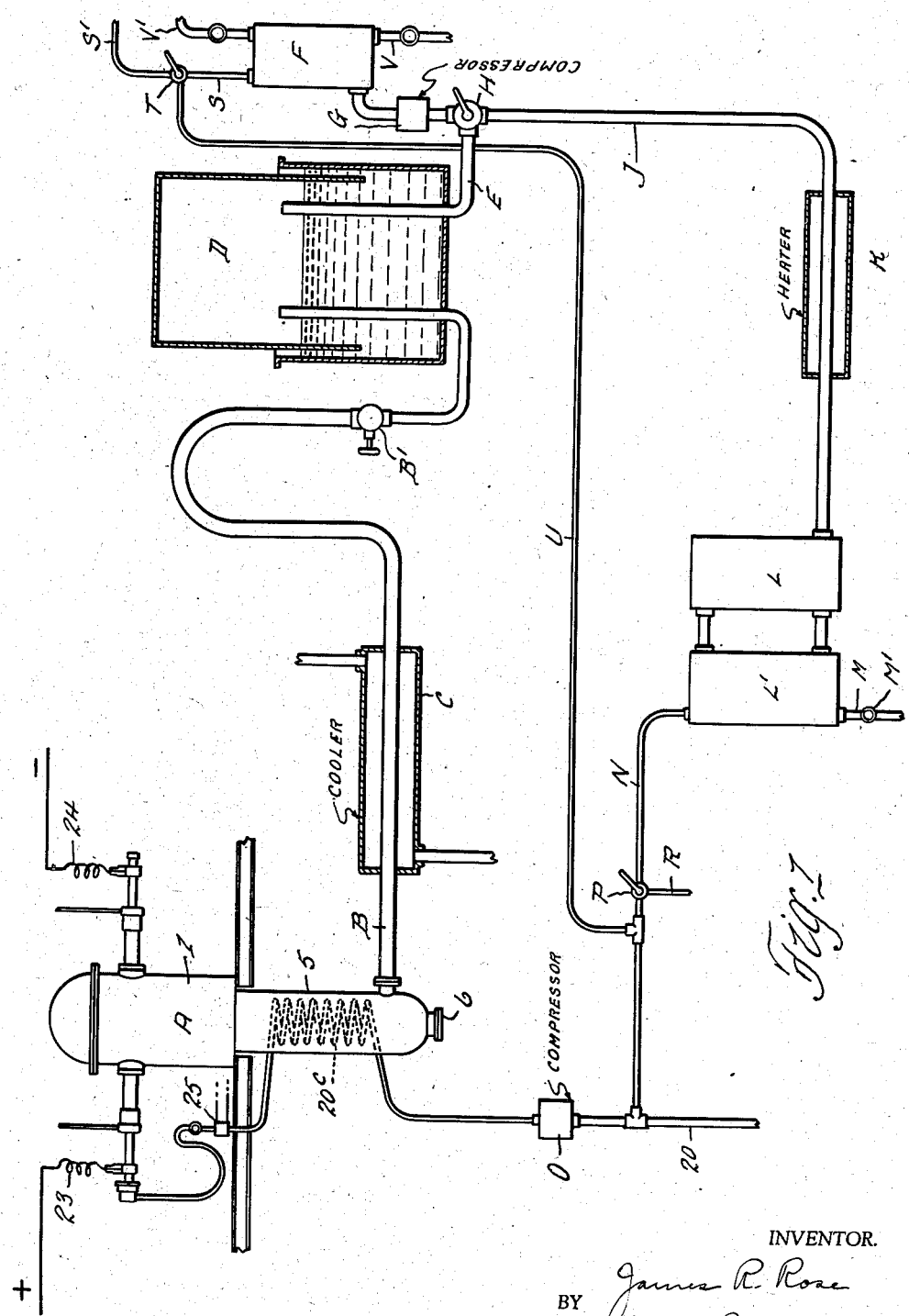

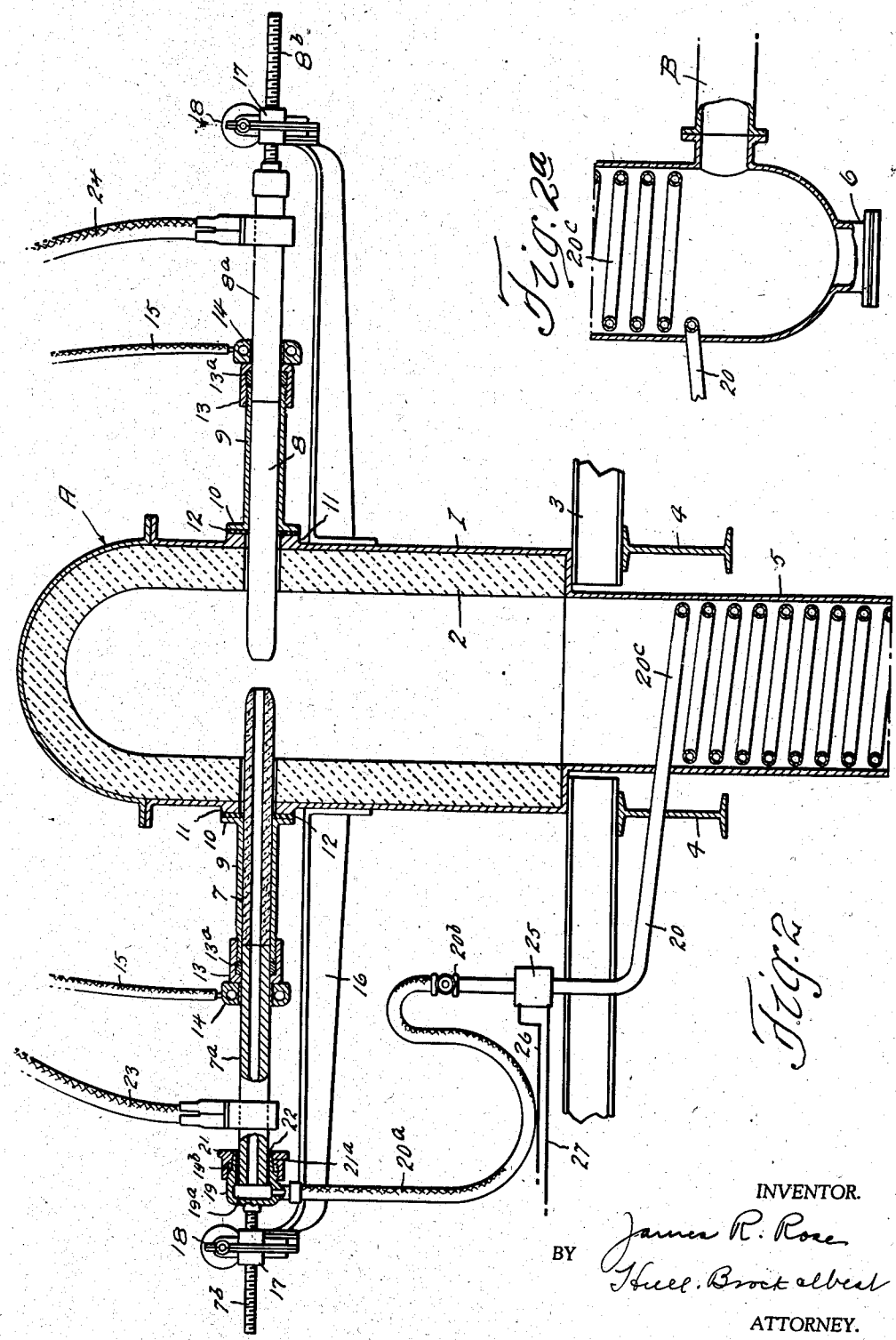

2,080,931

UNITED STATES PATENT OFFICE 2,080,931

PROCESS OF AND APPARATUS FOR THE TREATMENT OF HYDROCARBON FLUIDS

James R. Rose, Edgeworth, Pa., assignor of three-fourths to Michael L. Benedum and Joseph C. Trees, both of Pittsburgh, Pa.

Application December 20, 1935, Serial No. 55,389

10 Claims. (Cl. 204—31)

This invention relates to a process of and apparatus for the treating of hydrocarbon fluids for the purpose of producing therefrom a hydrocarbon fluid of different carbon content; and, in the embodiment of my invention shown and described herein is particularly adapted for the manufacture of acetylene and/or benzene.

It is the general purpose and object of the invention to provide a process and apparatus whereby a relatively cheap and widely distributed hydrocarbon fluid, such as methane or natural gas, may be converted efficiently and economically into a richer hydrocarbon, such as acetylene and/or benzene.

I realize the foregoing object and other and more limited objects which will appear hereinafter in and through the apparatus shown in the accompanying drawings wherein Fig. 1 represents a somewhat diagrammatic view, with certain parts in section, of such an apparatus; and Figs. 2 and 2a a vertical sectional view through the furnace and the cooperating parts shown in the preceding view.

In practicing my process, I deliver the methane or natural gas into the arc formed between electrodes under a pressure of from 50 to 200 atmospheres. The gas thus treated is converted into acetylene and hydrogen; the gas is maintained under a pressure which will prevent the acetylene from polymerization, after which it is cooled below the temperature at which polymerization may occur. Thereafter the acetylene and hydrogen liberated in the reaction can be collected and, when it is desired to use the acetylene as such, the gas will be compressed into acetone, whereby the acetylene will be absorbed, leaving the hydrogen free. When desired to obtain benzene, the mixture of acetylene and hydrogen will be led to a heater, which will result in polymerizing the same into benzene and the resultant mixture can then be conveyed through a separator and absorber whence the liquid benzene can be removed and so much of the hydrogen as may be necessary for the purpose can, if desired, be mingled with the methane or natural gas prior to its introduction to the furnace.

In referring to Fig. 1, A represents the furnace, the details of which are shown in Fig. 2; B represents the offtake for acetylene and excess hydrogent leading from the furnace through the cooler C. D represents an ordinary type of gasometer in which the mixture of acetylene and hydrogen is collected. From this gasometer, a pipe E conducts as much as may be desired of the mixture of acetylene and hydrogen to a receptacle F containing acetone, the acetylene being compressed into the acetone by a suitable compressor pump G. So much of the mixture of acetylene and hydrogen as it may be desirable to treat for the production of benzene and the separation of hydrogen therefrom is delivered by the three-way valve H into the pipe J, whence it passes through a heater K, which raises the mixture of gases to a temperature sufficient to produce polymerization of acetylene into benzene. The mixture of hydrogen and gaseous benzene is then conducted into the separator and absorption apparatus indicated at L and L' where the benzene is separated in liquid form and whence it may be removed through the offtake pipe M and the valve M', the hydrogen escaping through the pipe N. If desired, a certain proportion of this hydrogen may be directed into the pipe 20 which leads to the compressor O for forcing the gas which is to be treated into the furnace A. A three-way valve P controls the supply of hydrogen to the pipe 20 and to a point of waste or storage through the pipe R.

The separating and absorbing apparatus L, L' may be of any standard type, one such apparatus being that known to the trade as "Lectrodryer" and employing therein activated alumina. From the tank F, the hydrogen, which will not be absorbed by the acetone, will be taken off through the pipe S, which may also be provided with a three-way valve T by means of which hydrogen may be directed through the pipe U into the pipe N or otherwise delivered into the pipe 20 which conveys the hydrocarbon fluid (preferably methane or natural gas) into the furnace A. Whatever hydrogen may not be needed for admixture with the gas delivered to the furnace will be conducted to storage through the pipe S'. Acetylene, freed from carbon, may be taken from the tank F through the pipes V or V'.

Referring now to Fig. 2, the furnace, indicated generally by A, comprises an upper section having a metallic external wall 1 and a lining 2, preferably of carbon blocks. This upper section is shown as resting on any suitable support, such as the beams 3 and 4, with the lower extension 5 having at the bottom the offtake connection B and also an opening 6 below the offtake through which carbon or other non-volatile or non-gaseous materials may be removed.

Projecting into the upper portion of the furnace from opposite sides thereof are the hollow positive carbon electrode 7 and the solid negative carbon electrode 8. The outer end of the electrode 7 is engaged by a hollow plunger 7a and the outer end of the electrode 8 is engaged by a solid plunger 8ª. Each of these electrodes and the inner end of each of the plungers 7ª and 8ª are mounted within a casing 9, and each casing has a flange 10 by means of which it is secured to a seat 11 formed on the furnace wall 1 and surrounding the opening through which the electrode projects. Insulation 12 is inserted between the flanges 10 and 11.

At its outer end, each casing 9 is provided with a stuffing box 13 having packing 13ª therein, thereby to prevent leakage of gas around the electrodes to the exterior of the furnace. Beyond each stuffing box, each plunger is provided with water-cooling means comprising an annular chamber 14 surrounding each electrode, each chamber being connected with a cooling-water supply pipe 15.

16 denotes brackets secured to the outer wall of the furnace and provided each at its outer end with a sleeve 17 through which extend threaded operating rods 7ᵇ and 8ᵇ for the plunger rods 7ª and 8ª respectively. Each of these rods is engaged by an automatic feeding device 18, such as is well known in the industry and which will maintain substantially constant the distance between the inner ends of the electrodes.

The hollow plunger rod 7ª and the electrode 7 are connected, through a housing 19 having at its outer end a chamber 19ª, with the flexible section 20ª of a gas-supply pipe 20 having a valve 20ᵇ. The inner or furnace-facing end of the chamber 19 is extended at 19ᵇ to form a tapered split sleeve which may be brought into engagement with the outer end of the plunger rod 7ª by means of a nut 21 having a tapered extension 21ª adapted to engage the tapered surface of the sleeve. Insulating material may be inserted between the sleeve and the plunger rod, as indicated at 22.

23 and 24 denote electrical conductors connected to the plunger rods 7ª and 8ª, whereby said rods form external portions of the positive and negative electrodes.

Gas, such as methane, supplied through the pipe 20, enters the lower extension of the furnace, where the pipe is formed into a coil 20ᶜ, preferably located adjacent to the furnace wall. The upper or rear end of the coil extends through the furnace wall and to the casing of the valve 20ᵇ. 25 denotes any conventional high frequency apparatus applied to a suitable portion of the pipe 20 and capable of subjecting the gas in this portion of the pipe to the disruptive action of the arc, the said device being provided with conductors 26 and 27.

In carrying out my process in and through the apparatus which I have shown and described, and assuming that the object is to produce acetylene and/or benzene from natural gas or methane, the said gas is conducted through the pipe 20 to the compressor O, whereby it is supplied into the furnace A under a pressure of from 50 to 200 atmospheres, the pressure being maintained by the conjoint action of the compressor and the valve B'. The gas is preferably preheated by passing through the coil 20ᶜ, and is also preferably subjected to the disruptive action of high frequency current through the apparatus 25, which effects a partial preliminary dissociation or ionization of the same. The high-frequency apparatus may be one of the type manufactured by the General Electric Company and the Westinghouse Electric & Mfg. Company, comprising a chamber through which the gas is conveyed, said chamber containing non-sparking high-frequency coils, whereby an initial dissociation of the gas is instituted, which dissociation is completed by the arc formed between the electrodes. Frequencies of 12,000,000 cycles per second are conventional and may be employed herein. Due to the manner of mounting the electrodes and their plunger rods, the gas thus supplied to the furnace can be maintained under the desired pressure without leakage around the electrodes and the plunger rods. In the arc formed between the electrodes, the methane is dissociated into acetylene and a gaseous fluid consisting essentially of hydrogen, in accordance with the reaction noted hereinbefore. Due to the pressure, the acetylene will not polymerize into benzene, notwithstanding the temperature.

The resultant mixture of acetylene and hydrogen will be delivered to the offtake flue B, such carbon as may be produced being removed through the offtake 6. The mixture of acetylene and hydrogen is passed through the cooler C, where its temperature is reduced below that which would produce polymerization; that is to say, below a temperature of 450° F. Through the valve B', the gaseous mixture is delivered under a pressure of a few ounces into the gasometer D, whence the mixture may be delivered through pipe E and valve H to the compressor G, whereby the mixture so delivered may be compressed into acetone contained within the tank F. The hydrogen, not being absorbed in the acetone, will be removed through the pipe S and may be conducted thence to any point of storage; or a portion of the same may be directed by the three-way valve T into the pipe U, which communicates through the pipe N with the pipe 20 supplying methane to the furnace A.

Such proportion of the mixture of acetylene and hydrogen as it may be desirable to utilize for the production of benzene is conducted through pipe E, valve H and pipe J to the heater K, where the mixture is heated to a temperature of 1000° F. or more. This will result in polymerizing the acetylene into benzene; and the benzene and hydrogen will then be conducted to the separating and absorbing apparatus L, L', where the benzene will be separated in liquid form and whence it may be withdrawn through the pipe M. The hydrogen will be taken off by the pipe N and a portion of the same may be allowed to enter pipe 20 through the three-way valve P, in the event that hydrogen is not being supplied thereto through the pipe U, or if it is desirable to supplement the supply through the latter pipe.

It has been found in practice that, notwithstanding the fact that hydrogen is liberated in the furnace, nevertheless the presence of additional hydrogen is desirable, to facilitate the dissociation of the methane and to limit, if not prevent, the destruction of the carbon electrodes and carbon furnace lining. Hence the provision for introducing the hydrogen into the furnace, and preferably in conjunction with the methane.

Having thus described my invention, what I claim is:

1. The process of producing acetylene which comprises subjecting an aeriform hydrocarbon fluid to the action of an electric arc under a pressure of from 50 to 200 atmospheres; cooling the gaseous products thus formed, while still under said pressure, to a temperature below that wherein polymerization of acetylene will occur, and collecting the gaseous products thus cooled.

2. In the process of producing acetylene as claimed in claim 1, preheating the hydrocarbon fluid prior to its subjection to the action of the electric arc.

3. In the process of producing acetylene as claimed in claim 1, subjecting the hydrocarbon fluid to the disruptive action of a high frequency current prior to subjecting the fluid to the action of an electric arc.

4. In the process of producing acetylene as claimed in claim 1, preheating the hydrocarbon fluid and subjecting the same to the disruptive action of a high frequency current prior to subjecting the fluid to the action of an electric arc.

5. The process of producing acetylene which comprises subjecting an aeriform hydrocarbon fluid to the temperature of an electric arc, thereby to dissociate the same into a gaseous product containing acetylene and a gaseous fluid containing a large proportion of hydrogen; maintaining the gaseous product produced by such dissociation under a pressure sufficient to prevent polymerization of the acetylene; cooling said gaseous product while still under said pressure, to a temperature below that wherein polymerization of acetylene will occur; separating the acetylene from the other constituents of said gaseous product; and delivering more or less of such other constituents into the arc together with the hydrocarbon fluid.

6. In the process of producing acetylene as claimed in claim 5, admixing the said other constituents with the hydrocarbon fluid, preheating the mixture, and subjecting the mixture to the disruptive action of a high frequency current prior to subjecting the mixture to the action of the electric arc.

7. In an apparatus for the manufacture of a hydrocarbon fluid, the combination of a furnace having electrodes therein with their inner ends in proximity to each other; means for delivering an aeriform fluid under high pressure into the region of the arc produced between said electrodes; an offtake flue leading from said furnace, a valve in said flue for controlling the pressure in said flue and in said furnace; a cooling device for the said flue, between the said furnace and the said valve; gas-collecting means beyond the said valve; means connected with the said collecting means for separating the gases thus collected; and a pipe for delivering under pressure one of the gases thus separated into the said furnace and into the region of the said arc.

8. In an apparatus for the manufacture of benzene, the combination of a furnace having electrodes therein with their inner ends in proximity to each other; means for delivering an aeriform fluid under high pressure into the region of the arc produced between said electrodes; an offtake flue leading from said furnace; a valve in said flue for controlling the pressure in said flue and in said furnace; a cooling device for the said flue, between the said furnace and the said valve; gas-collecting means beyond the said valve; means connected with the said collecting means for separating gases thus collected; a heater; means for delivering gases from the collecting means to said heater; a separator and absorber connected to said heater; and means for delivering under pressure one of the gases thus separated into the region of the arc in said furnace.

9. In an apparatus for the manufacture of a hydrocarbon fluid, the combination of a furnace having electrodes therein with their inner ends in proximity to each other; means for delivering an aeriform fluid under high pressure into the region of the arc produced between said electrodes; an offtake flue leading from said furnace, a valve in said flue for controlling the pressure in said flue and in said furnace; a cooling device for the said flue, between the said furnace and the said valve; and gas-collecting means beyond the said valve.

10. In an apparatus for the manufacture of benzene, the combination of a furnace having electrodes therein with their inner ends in proximity to each other; means for delivering an aeriform fluid under high pressure into the region of the arc produced between said electrodes; an offtake flue leading from said furnace; a valve in said flue for controlling the pressure in said flue and in said furnace; a cooling device for the said flue, between the said furnace and the said valve; gas-collecting means beyond the said valve; means connected with the said collecting means for separating gases thus collected; a heater; means for delivering gases from the collecting means to said heater; and a separator and absorber connected to said heater.

JAMES R. ROSE.